United States Patent [19]

Baldwin et al.

[11] Patent Number: 4,827,413

[45] Date of Patent: May 2, 1989

[54] MODIFIED BACK-TO-FRONT THREE DIMENSIONAL RECONSTRUCTION ALGORITHM

[75] Inventors: David R. Baldwin, Shepperton; Geoffrey L. Thiel, Richmond, both of England

[73] Assignee: Kabushiki Kaisha Toshiba, Kanagawa, Japan

[21] Appl. No.: 62,598

[22] Filed: Jun. 16, 1987

[51] Int. Cl.[4] .............................................. G06F 15/42
[52] U.S. Cl. ........................... 364/413.19; 364/413.18; 340/727
[58] Field of Search ........... 364/414, 521, 522, 413.19, 364/413.18; 340/727, 747

[56] References Cited

U.S. PATENT DOCUMENTS

| 4,729,098 | 3/1988 | Cline | 340/727 X |
|---|---|---|---|
| 4,736,330 | 4/1988 | Capowski | 340/724 X |
| 4,737,921 | 4/1988 | Goldwasser | 340/723 X |

Primary Examiner—Jerry Smith
Assistant Examiner—Steven G. Kibby
Attorney, Agent, or Firm—Finnegan, Henderson, Farabow, Garrett, & Dunner

[57] ABSTRACT

A method for displaying three dimensional imaging system data uses a modified Back To Front algorithm. With that algorithm, imaging system data are interpolated and converted into a series of vectors defined by a starting point in space and a length corresponding to consecutive non-zero imaging system data points. The vectors are transformed to an observer's viewpoint coordinate system and plotted on a CRT display.

16 Claims, 7 Drawing Sheets

MODIFIED BACK-TO-FRONT THREE DIMENSIONAL RECONSTRUCTION ALGORITHM

This application is related to a copending application, Ser. No. 934,846 filed on Nov. 25, 1986.

BACKGROUND OF THE INVENTION

The present invention relates generally to the field of displaying three dimensional (3D) information, and more specifically to a modified Back To Front (BTF) algorithm for the CRT display in a 3D format of sectional data from, for example, a Computed Tomography (CT) scanner.

Medical imaging systems such as CT and magnetic resonance imaging devices, use computer analysis techniques to analyze three dimensional image data of an object such as a human organ. Depending on the orientation of the object and the desired viewpoint of an observer, the three dimensional image data are converted to a two dimensional Cathode Ray Tube (CRT) image of the object. The standard BTF algorithm can generate two dimensional images of three dimensional objects without the need for time consuming surface contour or boundary detection computations. An object composed of individual "voxel" elements can be displayed without extracting information about the object's surface. A voxel is a parallelepiped data element used to generate a two dimensional pixel, or CRT picture element, of an object. Key to the BTF algorithm is the order in which the voxels are scanned to produce a final projected image. Later-scanned (front) voxels are used to generate pixels that overwrite and hence hide pixels from earlier-scanned (back) voxels. Furthermore, since the BTF algorithm does not require the checking of a projected voxel's depth, as do algorithms requiring surface information, the display memory is updated by a relatively quick write operation rather than a read, check for depth, and write operation of the other methods. Pixels on the CRT have a brightness proportional to the proximity of the voxel to the front or back of the object being viewed.

A standard BTF algorithm requires input data along about 40 parallel planes through an object. Each plane typically consists of 512×512 pixels. To conserve computer memory, each slice can be compressed to 256×256 pixels when read from the data storage disk. Next the data are "cuberilled" (converted to cubic voxel elements) by interpolating between the planes to calculate 256 uniformly spaced intermediate planes, thereby creating a volume containing 256×256×256=16,777,216 voxels. Each voxel represents a data element with a value p located in a three dimensional "object space" by the Cartesian coordinate triplet, Xv, Yv, and Zv. The data value p represents a property of the object, such as density, at that space location.

Where the specimen being scanned is a patient lying face up, the origin of the object coordinate system is usually at the patient's head. The Z axis runs through the head to the feet, the X axis runs through the ears, and the Y axis runs from the forehead to the back of the head. Voxels in each plane have a constant Z value.

Each voxel is then converted to a binary 0 or 1 either by comparison to a look up table or by comparison to a threshold level. As described by Frieder et al. in "Back-to-Front Display of Voxel Based Objects," IEEE Computer Graphics and Applications, Jan. 1985, pp. 55–60, implementation of the standard BTF algorithm involves reading voxels in a three dimensional array starting at the farthest corner from the observer's viewpoint and proceeding in order of increasing X, Y, and Z values. The algorithm then requires transforming the converted voxels for CRT display. In practice, each plane is read from disk storage to memory in order of plane (i.e., Z value), and is scanned and printed in order of increasing X and Y within each plane. "Front" planes overwrite "back" planes and hide the earlier written voxels. A front plane is the plane closest to the observer's viewpoint and either has the lowest or highest value of Z depending on the observer's location.

An observer's viewpoint or viewing position is referenced to the object coordinate system by its position, Xe, Ye, and Ze, in that coordinate system and by the direction of view, defined as the three angles a vector in this direction would make with the object coordinate system axes.

An image coordinate system for a CRT is defined by an X axis parallel to the bottom of the CRT, a Y axis parallel to the left edge of the CRT, and a Z axis projecting into the front face of the CRT. This coordinate system defines the "image space."

A transformation matrix maps the voxel data in object space at Xv, Yv, Zv into pixel data in image space at Xi, Yi, Zi. The Xi and Yi coordinates locate the pixel on the screen, and the brightness is set by the value of Zi. The viewing position and attitude transformations can be combined in a single 4×4 matrix or can be computed separately as a 3×3 matrix and a translation (addition) operation. A drawback of the standard BTF methods is that 3D image reconstruction typically requires up to 16 million matrix transformations involving a very large number of multiplications. The standard BTF transformations using a 3×3 matrix, and ignoring translation components, consist of:

$$[X_i\ Y_i\ Z_i] = [X_v\ Y_v\ Z_v] * \begin{vmatrix} a & b & c \\ d & e & f \\ g & h & i \end{vmatrix} \text{ or,} \quad (1)$$

$$X_i = a*X_v + d*Y_v + g*Z_v$$

$$Y_i = b*X_v + e*Y_v + h*Z_v \quad (2)$$

$$Z_i = C*X_v + f*Y_v + i*Z_v$$

Because voxels are transformed one plane at a time, the Zv values are constant for the entire plane. The transformation calculations may therefore be simplified to:

$$X_i = a*X_v + d*Y_v + K1;\ \text{where}\ K1 = g*Z_v$$

$$Y_i = b*X_v + e*Y_v + K2;\ \text{where}\ K2 = h*Z_v \quad (3)$$

$$Z_i = c*X_v + F*Y_v + K3;\ \text{where}\ K3 = i*Z_v$$

The constants K1, K2, and K3 are calculated only once per plane, and the translation values can easily be included with them. Within each plane, the voxels are transformed one line at a time such that the Yv value along each line is constant. The transformation equations may thus be further simplified to:

$$Xi = a*Xv + K4; \text{ where } K4 = d*Xv + K1$$

$$Yi = b*Xv + K5; \text{ where } K5 = e*Yv + K2 \quad (4)$$

$$Zi = c*Xv + K6; \text{ where } K6 = f*Yv + K3$$

The constants K4, K5, and K6 are calculated only once per line. To aid computation further, adjacent voxels on a line are transformed to an incremental calculation, simplifying the transformation equations to:

$$[Xi]_{u+1} = [Xi]_u + a$$

$$[Yi]_{u+1} = [Yi]_u + b \quad (5)$$

$$[Zi]_{u+1} = [Zi]_u + c$$

Even with the simplifications introduced by equations (3)–(5), the standard BTF algorithm just described is slow, typically requiring several millions of computations per image, and the resultant image may have aliasing artifacts if the observer's viewpoint is too close to the object, which results in adjacent voxels mapping to non-adjacent pixels, hence holes appear in the image.

It is therefore an object of the present invention to reduce the number of transformations needed to project an image using a BTF algorithm.

It is another object of the present invention to reduce aliasing artifacts by resampling the voxel data in one dimension as a function of the pixel resolution of the screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, an apparatus for displaying a two dimensional image of a three dimensional object comprises a three dimensional imaging means for generating first data values representing a property of the object at a plurality of points throughout the object; an interpolating means, coupled to the imaging means, for generating from the first data values, second data values representing the property of the object in a plurality of parallel planes through the object; run length coding means coupled to the conversion means, for generating along a plurality of paths in each of the parallel planes a plurality of run length coded vectors having directions and lengths determined from the second data values; and rotating means for transforming each of the vectors to a coordinate system based upon a selected origin representing a viewpoint from which the object is to be viewed.

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Figure 1:
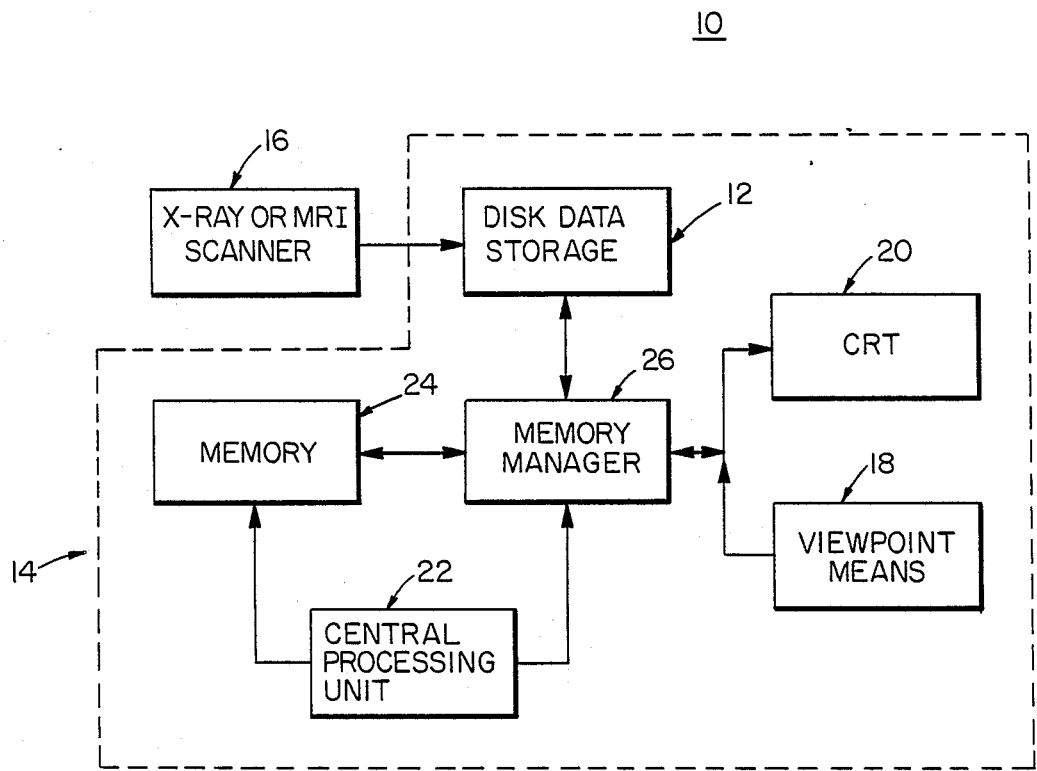
FIG. 1 is a block diagram of an apparatus used to generate, transform, and display 3D imaging data.

Reference will now be made in detail to the present preferred embodiment of the invention as illustrated in the accompanying drawings.

The apparatus described as the preferred embodiment displays a two dimensional CRT image of an object by using a modified BTF algorithm to transform data representative of a property of a three dimensional object scanned by a medical imaging device, such as a CT scanner.

In accordance with the present invention, an apparatus for supplying a two dimensional image of a three dimensional object comprises three dimensional imaging means for generating first data values representing a property of the object at a plurality of points throughout the object. In a preferred embodiment of the invention shown in FIG. 1, x-ray scanner 16 is a three dimensional imaging means which produces 512×512 pixels per plane, located on 40 planes taken through the object. The pixels each represent the density of the object at the corresponding location.

Further in accordance with the present invention, the apparatus includes interpolating means, coupled to the imaging means, for generating from the first data values, second data values representing the property of the object in a plurality of parallel planes throughout the object, run length coding means, coupled to the conversion means, for generating along a plurality of paths in each of the parallel planes a plurality of run length coded vectors having directions and lengths determined from the second data values, and rotating means for transforming each of the vectors to a coordinate system based upon a selected origin representing a viewpoint from which the object is to be viewed. In a preferred embodiment, image processor 14, which is preferably a Toshiba CHP-01A image processor, performs the functions of such means according to computer programs whose operation is described below. The image processor 14, which is integral to scanner 10, includes a central processing unit 22 and associated memory 24, a memory manager 26, disk data storage 12, viewpoint means 18, and a CRT 20. The central processing unit 22, memory 24, and memory manager 26 together perform the control functions for image processor 14. The disk data storage acts as a means for storing the first data values from scanner 16, and viewpoint means 18, which can be a joystick or other user interactive device, is an embodiment of a means for selecting a viewpoint in space from which to view the object, in accordance with the present invention. CRT 20, which is a standard CRT terminal capable of displaying graphics information, is a display means for plotting a CRT image of the stored information vectors.

The detailed operation of image processor 14 in scanning system 10 is explained in detail below. It should be understood that the embodiment shown in FIG. 1 is one which is presently preferred and in no means limiting on the invention. For example, it is entirely possible to include circuitry to perform the functions of interpolating, run length coding, and rotating the vectors.

Figure 2:
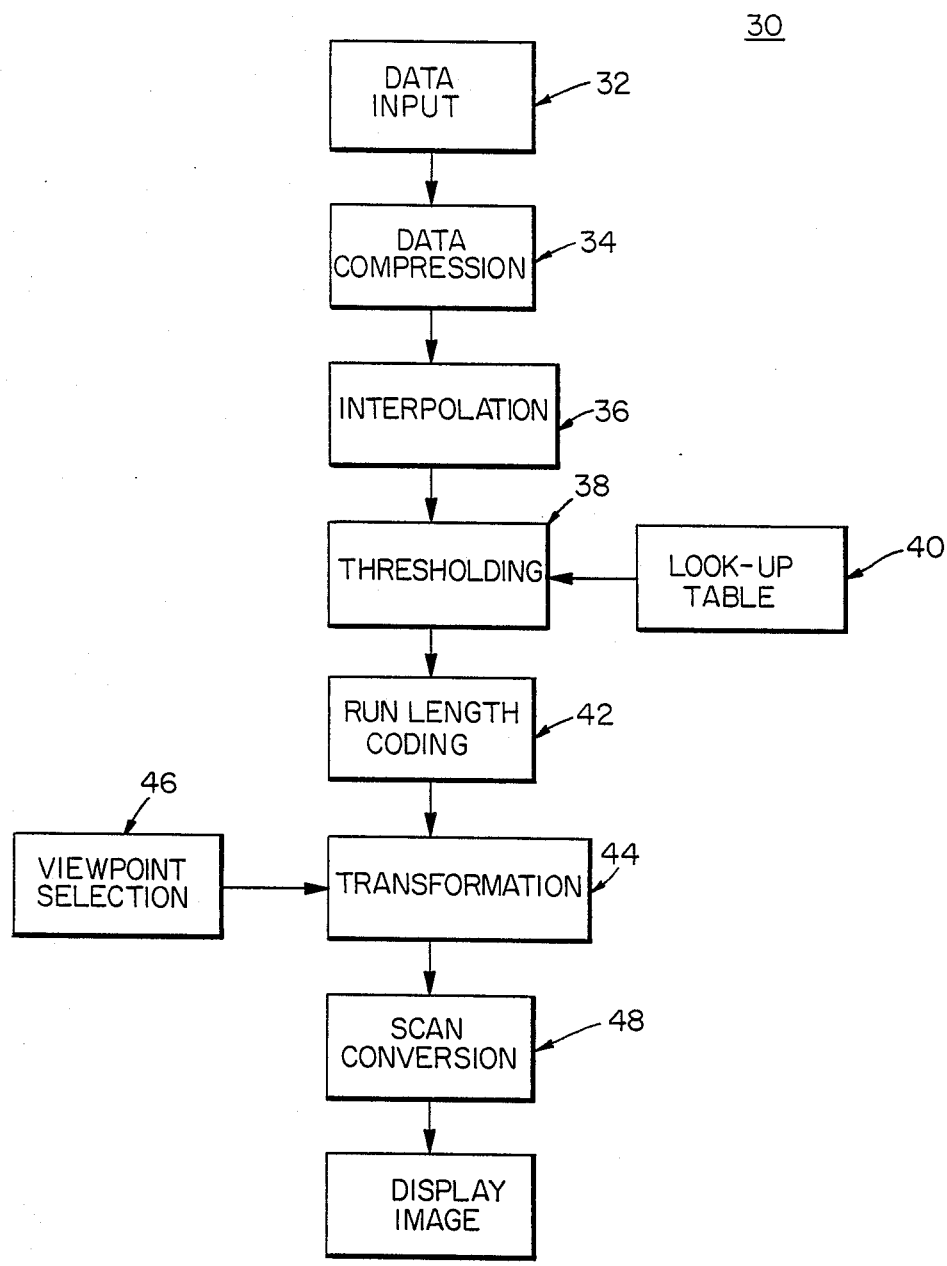
FIG. 2 is a flow diagram of the functions performed by the apparatus in FIG. 1 to transform 3D imaging data from object space to image space.

After the pixels are generated and stored on disk 14, the pixel data are processed by image processor 14 according to the steps of flowchart 30 of FIG. 2. First the pixel data are read from data storage disk 12 (step 32). Next, to conserve memory, each plane of 512×512 pixels is compressed to 256×256 pixels (step 34). The data are then "cuberilled" (converted to cubic voxel elements) by interpolating between the planes to calculate 256 parallel, uniformly spaced intermediate planes, thereby creating a volume containing 256×256×256=16,777,216 voxels (step 36). Voxels are next preferably converted to binary data values (zeros and ones) by comparing the data to a threshold level (step 38). The comparison standard may be provided by a lookup table such as in step 40, or by other methods such as calculations.

Recognizing that a straight line in object space transforms into a straight line in image space, only the end voxels of a line of voxels need to be transformed from object space to image space rather than all the intermediate voxels along a line segment. The result is a large savings in calculations.

Figure 6:
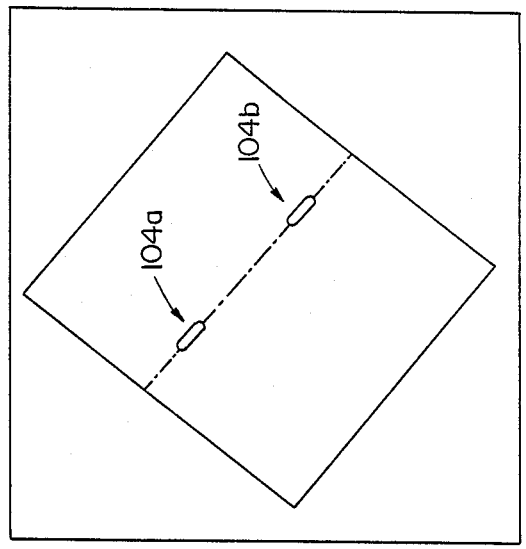
FIG. 6 is a schematic representation of an image of the cylindrical object in FIG. 5 transformed using the modified BTF algorithm of the present invention.
Figure 5:
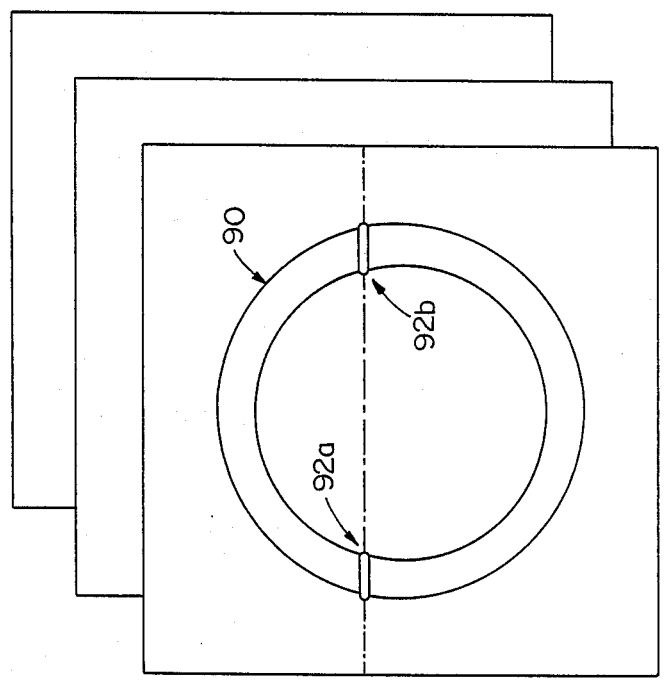
FIG. 5 is a schematic representation of planes of converted binary image data of a representative cylindrical object prior to transformation by the modified BTF algorithm of the present invention.

FIG. 5 shows the converted binary image data 90 of a representative cylindrical object lying in one of several parallel planes. Linear sets of contiguous non-zero binary data values 92a and 92b can be considered to be vectors defined by a length and a starting point. The vectors will transform to straight lines 104a and 104b of FIG. 6 in image space. In view of this, a series of Run Length Coded (RLC) vectors is generated from the binary data, step 42 of FIG. 2. Run length coding converts a string of non-zero voxels along a predetermined path in object space into a vector [Xv,Yv,Zv,L] where the starting point of each vector is defined by coordinates Xv, Yv, and Zv, the length is L, and the direction is parallel to the predetermined path.

Figure 3:
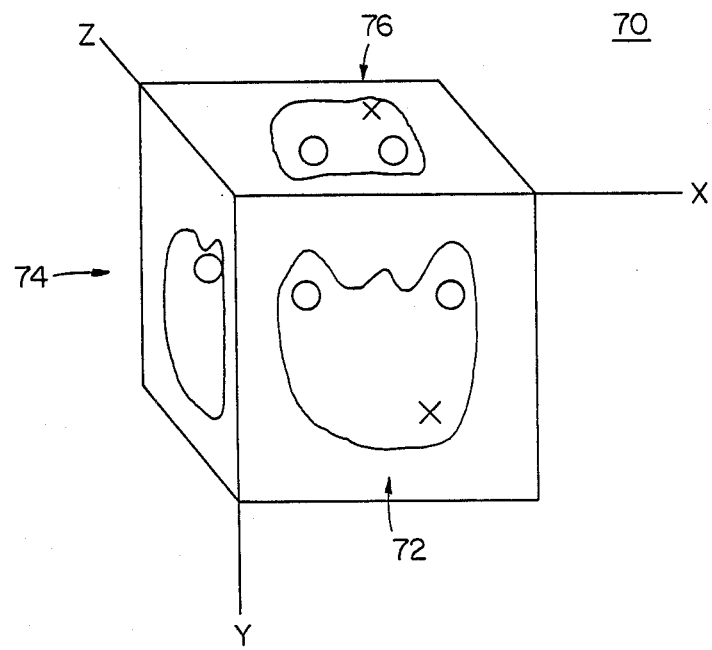
FIG. 3 shows the Transverse, Saggital, and Coronal faces of a set of voxel data in object space.

FIG. 3 shows a cube 70 in object space referenced to a 3D coordinate system X, Y, and Z, and consisting of 256 parallel planes, each containing 256×256 voxels. The cube of voxels has three orthogonal faces passing through the origin of the coordinate system: (1) Transverse face 72, where all values of Z are constant, (2) Saggital face 74, where all values of X are constant, and (3) Coronal face 76, where all values of Y are constant. In a preferred method, run length coding of the voxels into vectors is chosen to begin on a plane of voxels, 80 of FIG. 4a, which is parallel to the Transverse face and located at Z=255. Voxels are first coded in the X direction from X=255 at point 82 of FIG. 4a to X=0 at point 84, along a path where Y=0. The coordinates of the first non-zero voxel along the path are stored as the start point of an RLC vector of unit length. As each consecutive non-zero voxel is encountered along the path, the length of the RLC vector is increased by one. The length of the RLC vector is terminated at the last non-zero voxel encountered.

The next non-zero voxel encountered along the path starts a new RLC vector, and the process of identifying the starting coordinates of a unit vector, and augmenting the length of the vector as additional non-zero voxels are encountered is repeated for a new vector. At the end of the path, when X=0, the value of Y is incremented by one voxel, and the process is repeated along the new path. The process of scanning a path, incrementing Y, and scanning the next path continues until the entire plane at Z=255 is complete. The value of Z is then decremented and the process of coding vectors along the next plane 86 is accomplished.

Each successive plane is scanned until all planes parallel to Tranverse face 72 have been scanned. Scanning is next conducted for each plane parallel to Sagittal face 74 as shown in FIG. 4b, and then for each plane parallel to Coronal face 76, as shown in FIG. 4c. The scanning sequence to code the entire cube of voxels is a series of programmed loops shown in "pseudocode" form as shown below:

|  | Minor Axis (fastest changing) | Rows | Major Axis (planes) |
| --- | --- | --- | --- |
| Transverse | x: 255 to 0 | y: 0 to 255 | z: 255 to 0 |
| Saggital | z: 0 to 255 | y: 0 to 255 | x: 255 to 0 |
| Coronal | x: 255 to 0 | z: 0 to 255 | y: 0 to 255 |
| For each RLC direction (T, S, or C) | | | |
| For each voxel on a major axis | | | |
| For each row | | | |
| For each vowel within a row | | | |
| If a new vector | | | |
| store start coordinates | | | |
| else | | | |
| update and store length | | | |
| Generate tables defining vectors within CPU memory | | | |
| Transfer resulting vectors to block memory | | | |
| Return display to user interface | | | |

Each voxel is coded along a path, each path is completed on a plane, and each plane parallel to a face is completed in the following order:
1. Planes parrallel to the Transverse face from Z=255 to Z=0
   a. Paths on each transverse plane, from Y=0 to Y=255 i. Voxels on each path, from X=255 to X=0
2. Planes parallel to the Saggital face from X=255 to X=0
   a. Paths on each saggital plane, from Y=0 to Y=255
      i. Voxels on each path, from Z=0 to Z=255
3. Planes parallel to the Coronal face from Y=0 to Y=255
   a. Paths on each coronal plane, from Z=0 to Z=255
      i. Voxels on each path, from X=255 to X=0

Figure 4A:
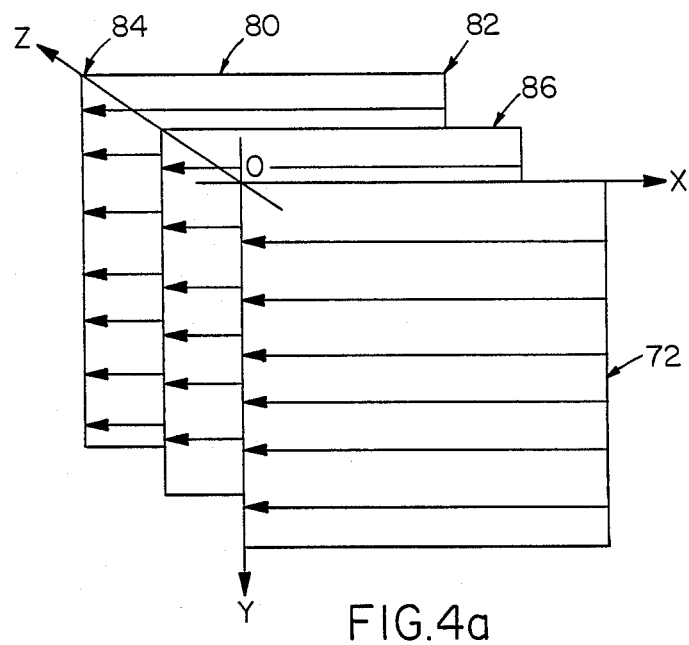
FIG. 4a shows the sequence of scanning the set of voxel data in FIG. 3 to generate Run Length Coded vectors in the Transverse Face direction.
Figure 4B:
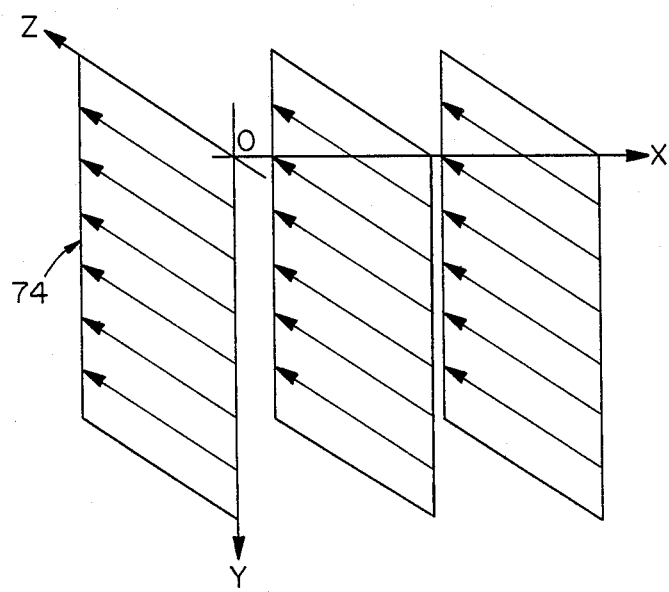
FIG. 4b shows the sequence of scanning the set of voxel data in FIG. 3 to generate Run Length Coded vectors in the Saggital Face direction.
Figure 4C:
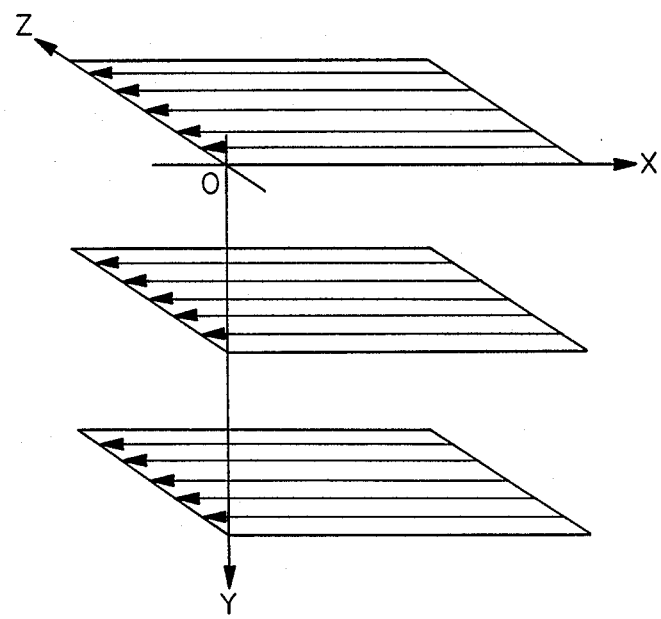
FIG. 4c shows the sequence of scanning the set of voxel data in FIG. 3 to generate Run Length Coded vectors in the Coronal Face direction.

FIGS. 4a, 4b, and 4c show the direction of the scan paths along a few representative planes parallel to each face. Run length coding in this manner produces three sets of RLC vectors. All vectors within each set are parallel to each other, and vectors in each set are orthogonal to vectors in any other set.

The next major step of converting the voxel data to a CRT image involves rotation of RLC vectors (step 44 of FIG. 2), to conform to the orientation of the observer's viewpoint, as selected in step 46.

By reading each of the three RLC data sets either backwards or forwards, six different views of the image can be drawn by image processor 14 of FIG. 1. Each view may be rotated by as much as plus or minus 45 degrees about the X and Y axes by an operator manipulating viewpoint means 18 of FIG. 1 while still conforming to the BTF display method.

Figure 7:
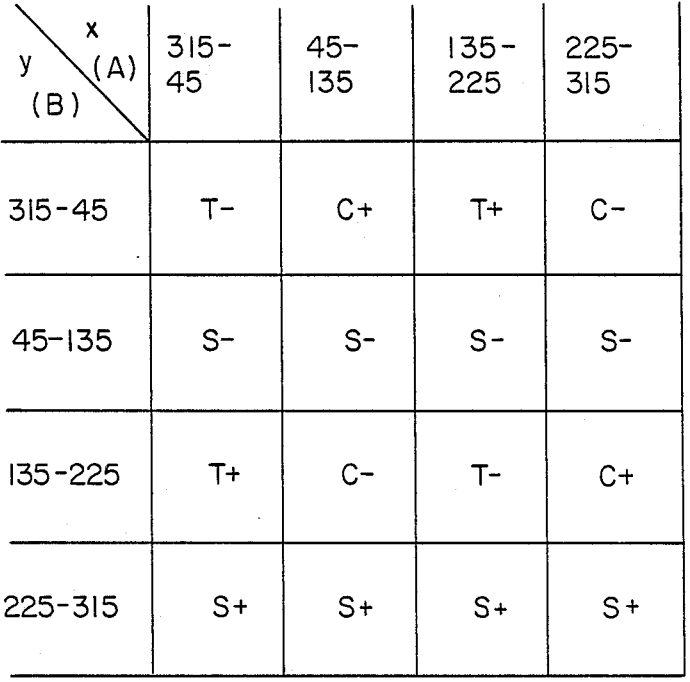
FIG. 7 shows the direction of reading Run Length Coded data sets for producing rotated images of a scanned object.

FIG. 7 shows the data sets that must be used for the specified rotations about the X and Y axes to always conform to the BTF algorithm. "T," "S" and "C" refer to the Transverse, Saggital and Coronal faces. Plus (+) and Minus (−) signs represent the direction passed through memory to access the vector data and thus the order in which the vectors are drawn. Positive rotation represents a clockwise rotation about an axis looking toward the origin, and rotation is assumed first to be about the X axis followed by a rotation about the Y axis, with the center of rotation being the center of the 256×256×256 cube of voxels 70 of FIG. 3. Depending on the RLC data set used to generate the image, one of three transformation matrices is used by image processor 14 of FIG. 1 to rotate the vectors from their object space orientation to their image space orientation so that an object results in the same position and orientation regardless of the data set used. The transformation matrices are selected as follows for use with each data set:

Transverse RLC data set:  $[X_i, Y_i, Z_i] = [X_v, Y_v, Z_v] * [T_t]$

Sagittal RLC data set:  $[X_i, Y_i, Z_i] = [X_v, Y_v, Z_v] * [T_s]$

Coronal RLC data set:  $[X_i, Y_i, Z_i] = [X_v, Y_v, Z_v] * [T_c]$

The transformation matrices are defined as products of the rotation matrices as follows:

$[T_t] = [T_x] * [T_y]$
$[T_s] = [T_z] * [T_y]$
$[T_c] = [T_x] * [T_y]$, and the rotation matrices are defined as:

$$[T_x] = \begin{vmatrix} 1 & 0 & 0 \\ 0 & \cos(A) & -\sin(A) \\ 0 & \sin(A) & \cos(A) \end{vmatrix}$$

$$[T_y] = \begin{vmatrix} \cos(B) & 0 & \sin(B) \\ 0 & 1 & 0 \\ -\sin(B) & 0 & \cos(B) \end{vmatrix}$$

$$[T_z] = \begin{vmatrix} \cos(A) & -\sin(A) & 0 \\ \sin(A) & \cos(A) & 0 \\ 0 & 0 & 1 \end{vmatrix}$$

where the angles A, B, represent rotation in a clockwise direction about the X, Y, axes respectively, looking toward the origin.

The final step of producing an image on CRT 20 of FIG. 1 involves scan conversion (step 48). This involves plotting (i.e., storing) the rotated vectors into a 256×256 "Z" buffer in image processor 14 memory using, for example, a standard Digital Differential Analyzer line plotting algorithm as described in "Principles of Interactive Computer Graphics" by Newman and Sproull, Computer Science Series, 2d ed. The length of each rotated vector as projected on the X-Y image plane governs the number of pixels on the CRT turned on by each vector. First the start address and initial Z value is calculated for each vector. All vectors within a data set are parallel both before and after transformation, therefore a constant address and Z increment is used for all vectors to specify successive pixel addresses and values within each vector. Thus vectors are plotted by repeatedly adding constant address and Z increments to the starting address and initial Z values for a length in pixels corresponding to the original vector length as projected onto the image plane.

Because the original voxels are coded and plotted as vectors there are no artifacts or holes along the vectors caused by undersampling the bitpacked data for non-orthogonal object orientations. However, to avoid artifacts and holes between vectors, each vector must be drawn twice on the CRT, the second vector having a start address and initial Z value at a small offset from the first vector.

Transforming the starting point of a line of voxels to image space and drawing scan converted run length encoded segments using the algorithms of this invention yields a similar result to the standard BTF method of transforming each voxel on a line, but at a large savings in the number of calculations. This is equivalent to run length coding the image for the non-zero voxels only. As a result Equation 3 needs to be calculated only to evaluate the start point of each Run Length Coded segment $X_i$, $Y_i$, and $Z_i$ rather than each voxel as in the standard BTF algorithm. in FIG. 5 there are approximately two Run Length Coded segments per line therefore two start point values must be calculated for each line, together with their projected lengths onto the image plane.

Rather than use the standard BTF method to compute a brightness value for each voxel along the line transformed to image space, the corresponding Z value for each pixel in image space touched by the scan converted run length encoded line segments is calculated to vary the image brightness along the lines to give an impression of depth. The number of brightness calculations therefore depends on the number of pixels touched by the projected line, not on the number of voxels composing the projected line. A line consisting of 100 voxels that touches only 50 pixels requires only 50 brightness calculations. The converse is also true, and additional calculations may be performed to fill in holes in the pixel data, thereby eliminating aliasing artifacts resulting from an observer's viewpoint being chosen so close to the object that gaps result in the CRT image.

The method of the present invention substantially reduces the number of calculations required to transform an image in object space to an image of the object in image space. The calculation advantage is best demonstrated by comparing the calculations required to transform the image of the cylindrical object of FIG. 5 using the standard BTF algorithm and the modified BTF algorithm of the present invention. Assume that each run length coded segment 92a or 92b of cylindrical object 90 of FIG. 5 is 25 voxels long and transforms to scan converted run length encoded segments 104a and 104b in FIG. 6 that are 25 pixels long. Conservatively, equatioon (3) must be evaluated 2×256×256 times or once for each start voxel per segment together with the projected length calculation for each vector Lp where $$Lp = Lv \times abs(b).$$

Lv is the length of the vector in object space and b is the term of a rotation matrix of the form $$[Tx] = \begin{vmatrix} a & b & c \\ d & e & f \\ g & h & i \end{vmatrix}$$

Equation (5) as modified by the present invention must be evaluated 25×2×256×256 times.

The calculations required by a standard BTF algorithm are:

| Equation | Number of times Evaluated | Number of Additions | Number of Multiplies |
|---|---|---|---|
| (4) | $256^2 = 65536$ | $65536 \times 3$ | $65536 \times 3$ |
| (5) | $256^3 = 16777216$ | $16777216 \times 3$ | none |

Total number of additions and multiplications =50,724,864. The calculations required by a BTF algorithm modified by the present invention are:

| Equation | Number of times Evaluated | Number of Additions | Number of Multiplies |
|---|---|---|---|
| (3) | $2 \times 256^2$ | $131072 \times 2 \times 3$ | $131072 \times 2 \times 3$ |
| (5) (modified) | $25 \times 2 \times 256^2$ | $3276800 \times 3$ | none |
| Projected length | $2 \times 256^2$ | none | 131072 |

Total number of additions and multiplications=11,534,336.

As the image is rotated, the number of calculations will decrease because of foreshortening. For example, at 45 degrees rotation, the line segments are 18 pixels long instead of 25, thereby reducing the number of arithmetic operations to about 10 million.

Additional advantages will readily occur to those familiar with the art. The invention in its broader aspects is, therefore, not limited to the specific details, representative method and illustrative example shown and described. Accordingly, departures may be made from such details without departing from the spirit or scope of the general inventive concept.

What is claimed is:

1. An apparatus for displaying a two dimensional image of a three dimensional object comprising:
   (a) three dimensional imaging means for generating first data representing a property of said object at a plurality of points throughout said object;
   (b) interpolating means, coupled to said imaging means, for generating from said first data, second data representing said property of said object in a plurality of parallel planes through said object;
   (c) run length coding means for generating, along a plurality of paths in each of said parallel planes, a plurality of run length coded vectors having directions and lengths determined from said second data;
   (d) rotating means for transforming each of said vectors to a coordinate system based upon a selected origin representing a viewpoint from which said object is to be viewed; and
   (e) display means for visually displaying said transformed vectors.

2. An apparatus of claim 1 wherein said three dimensional imaging means also includes means for storing said first data.

3. An apparatus of claim 1 further comprising conversion means, coupled to said interpolating means, for thresholding said second data to a plurality of binary data values.

4. An apparatus of claim 3 wherein said run length coding means includes means for forming said vectors with starting points located at a first occurrence of one of said binary data values encountered along each of said paths having a first value, and with lengths equal to the consecutive number of said binary data values having a first value encountered along said paths.

5. An apparatus of claim 1 wherein said rotating means includes means for selecting a viewpoint in space from which to view said object.

6. An apparatus of claim 1 wherein said display means includes scan conversion means for storing in predetermined order, each of said transformed vectors located on each of said planes.

7. An apparatus of claim 6 wherein said scan conversion means stores said transformed vectors in predetermined order starting with the one of said planes located at a position farthest from said viewpoint.

8. An apparatus of claim 1 wherein said display means is a CRT.

9. A method for displaying a two dimensional image of a three dimensional object comprising the steps of:
   (a) generating first data representing a property of said object at a plurality of points throughout said object;
   (b) interpolating said first data to generate second data representing said property of said object in a plurality of parallel planes through said object;
   (c) generating along a plurality of paths in each of said parallel planes a plurality of run length coded vectors having directions and lengths determined from said second data;
   (d) transforming each of said vectors to a coordinate system based upon a selected origin representing a viewpoint from which said object is to be viewed; and
   (e) displaying said transformed vectors on a display means.

10. The method of claim 9 wherein the step of generating said first data also includes storing said first data.

11. The method of claim 9 further comprising the step of thresholding said second data to a plurality of binary data values prior to the step of generating said run length coded vectors.

12. The method of claim 11 wherein the step of generating said run length coded vectors includes the substep of forming said run length coded vectors with starting points located at a first occurrence of one of said binary data values having a first value encountered along each of said paths and with lengths equal to the consecutive number of said binary data values having said first value encountered along said paths.

13. The method of claim 9 wherein the step of transforming each of said vectors further includes selecting a viewpoint in space from which to view said object.

14. The method of claim 9 wherein said step of displaying includes storing in predetermined order, each of said transformed vectors located in each of said planes.

15. The method of claim 14 wherein said step of storing in predetermined order further includes the step of starting with said plane located at a position farthest from said viewpoint.

16. The method of claim 9 wherein the step of displaying includes plotting a CRT image of said transformed vectors stored in predetermined order.

* * * * *